UNITED STATES PATENT OFFICE 2,049,512

DISPERSING AND EMULSIFYING AGENTS

Henry Alfred Piggott and George Stuart James White, Blackley, Manchester, England, assignors to Imperial Chemical Industries Limited, a corporation of Great Britain No Drawing. Application February 12, 1935, Serial No. 6,272. In Great Britain February 27, 1934

9 Claims. (Cl. 252—1)

This invention relates to the production of new substances having properties which make them useful as dispersing and emulsifying agents and useful also in other ways in the leather and textile industries.

The process of the invention consists in treating sod oil, degras, moellon or the like (see Holde, Kohlenwasserstoff oele und Fette, 6th edition, Berlin 1924, page 732; Lewkowitsch—Warburton, Chem. Technology and Analysis of Oils, Fats, Waxes, 6th edition, 1923, Vol. III, pages 429-439) with ethylene oxide.

By treating the substances mentioned above with ethylene oxide self-emulsifiable or water soluble substances are obtained, which give with water, even hard water, stable solutions or emulsions. These solutions or emulsions have valuable emulsifying properties and stable emulsions of mineral or fatty oils may be made by using them as emulsifying agents. The emulsions so obtained do not break on addition of acid.

In British Specification No. 380,431 a process for the manufacture and production of products suitable as assistants for the textile and related industries is described; this consists in esterifying or etherifying a water-insoluble organic compound other than a water-insoluble carbohydrate but containing at least one hydroxyl or carboxylic acid group or a group reacting like a carboxylic acid group under the conditions of working, with polyethylene glycols containing a chain of at least four ethenoxy groups, or with a corresponding quantity of ethylene oxide or ethylene halogen hydrin, at least $3n+1$ molecular proportions of the said ethylene oxide or ethylene halogen hydrin being used, $n$ being the number of the hydroxy and/or carboxy groups present in the molecule of the water insoluble organic compound. In the said specification a description is given of the condensation of oleic acid or ricinoleic acid with from 6-10 molecular proportions of ethylene oxide whereby viscous neutral oils soluble in water are obtained; palm oil and sperm oil, with 20 and 30 molecules of ethylene oxide respectively, are described as giving yellowish soft products; and divers uses of these various products are described.

By our invention sod oil, degras, moellon or the like is treated with ethylene oxide to give self-emulsifiable or water soluble substances having the valuable properties described below. Preferably we use sod-oil, the nature of which is sufficiently described by Lewkowitsch-Warburton (loc. cit. page 430). The sod oil is introduced into an autoclave, mixed preferably with a little caustic soda or other caustic alkali, or with a surface active substance such as silica gel or infusorial earth, the ethylene oxide (B. P. 12.5° C.) is pumped in either all at the beginning or in portions, and the mixture is heated. It is to be noted that reaction takes place with evolution of heat. As combination proceeds the pressure in the autoclave falls. The contents of the autoclave are then the product desired, adapted for immediate use, but as sod-oil often contains solid impurities (leather fibre, etc.) it may be necessary or desirable to filter or otherwise clarify the product.

The products obtained are brown, somewhat viscous, oily substances, freely miscible with water being either self-emulsifiable therewith or readily soluble. They are excellently suited for use as emulsifying agents, to give oil-in-water emulsions of animal, vegetable, or mineral oils, or other oil substances or water insoluble liquids or low melting-point solids. They are also suited for use as dispersing agents, and in other ways as described below. For most of these uses, and particularly for those described below, those products of the invention that are completely water soluble are to be preferred. It was not to be expected that from an oily substance, itself insoluble in water, and having the properties of a glyceride, completely water soluble substances should be obtained as are obtained from sod oil according to the invention.

As has been explained, these completely water soluble substances are of great use in the textile industry: they are useful as levelling assistants in dyeing and printing, and in dyeing with vat dyestuffs, especially indigo, they are useful for giving level dyeings fast to rubbing. Although in themselves they have almost no properties that would make them valuable as detergents, they have an excellent and surprising effect on the behaviour as detergents of the class that comprises the sulphuric esters of the higher long-chain aliphatic ($C_{12}$—$C_{20}$) alcohols; thus, a mixture of these substances, when used as a scouring agent for treating greasy and dirty wool, cleanses it much more effectively than the sulphuric ester of the higher alcohol alone, both in soft and hard water. Moreover, such a mixture disperses the alkaline earth salts of soap forming fatty acids, so that it can be used for adding to detergent liquors containing soap with the object of preventing an objectionable deposition of such salts on the textile goods that are being cleansed or otherwise treated.

The invention is illustrated but not limited by the following examples in which the parts are by weight.

Example 1

A mixture of 36 parts of sod oil, 36 parts of ethylene oxide, and 1 part of 2-N-aqueous-caustic soda is heated at 100° C. in a closed vessel until the internal pressure falls to zero on the gauge. 70 parts of a pale brown oil, which readily forms an emulsion when shaken with water, are obtained.

Example 2

When in the above example twice the weight of ethylene oxide (72 parts) is used a clear pale brown oil is obtained. This dissolves almost completely in water (a small amount of resinous matter remains in suspension). The aqueous solution thus obtained, when shaken with mineral oils gives excellent emulsions stable to acids and alkalis. Alternatively the pale brown oil is mixed with mineral oil (e. g. light lubricating oil) and water is added with stirring.

In the above examples the proportions of sod-oil and ethylene oxide are 1:1 and 1:2 respectively, and from these it is seen that proportions of about 1:2 are needed to give a water soluble product. When the proportions are 1:0.5 a similar product to that of Example 1 is obtained, of some use as an emulsifying agent; when the proportions are 1:3 the product resembles those of Examples 2 and 3 (below).

Example 3

12 parts of sod-oil and 0.5 part of 8% aqueous caustic soda are put in an autoclave and heated with stirring to 150° C. Ethylene oxide is pumped in. At first it is rapidly absorbed, and the heat evolved is itself about enough to keep the temperature at 150° C. Gradually the reaction becomes less vigorous and external heat must be applied. The addition of ethylene oxide is continued until 24 parts have combined, that combination is complete being shown by the fall of pressure recorded by the gauge to zero. The product obtained is a clear pale brown somewhat viscous oil, indistinguishable in properties from that of Example 2.

In the above examples, the sod oil used contained 12.3% of water; 2.4% of unsaponifiable matter; 87.5% of matter soluble in petroleum ether; and 12.7% of ash. When shaken with dilute aqueous caustic soda it formed a stable pale yellow emulsion.

The products of Example 3 may be used to emulsify oils, for example oleic oil as follows:—

1 part is mixed with 1 part of oleic acid and this mixture is added to 20 parts of oleic oil. The oleic oil then gives a stable white emulsion when stirred into water.

The product of Example 3 is mixed with one third of its weight of cetyl sodium sulphate (see e. g. von Cochenhausen, Dingler's Polytechnische Journal, vol. 303, page 283). The pasty composition thus obtained is an excellent detergent: when used in 0.1% aqueous solution an excellent scour of dirty-greasy wool is obtained, much superior to that given by cetyl sodium sulphate alone.

The following test illustrates the effectiveness of this composition in dispersing lime soaps.

90 parts of water of 20 degs. hardness and 10 parts of a 1 per cent aqueous soap solution were shaken together and allowed to stand for five minutes. 4 parts of a 0.75 per cent aqueous solution of the detergent composition were added and the mixture well shaken, and heated for two hours at 90° C. The solution was then filtered through black filter paper.

A high degree of success in dispersing the lime soap formed was clearly demonstrated by the absence of residue.

The usefulness of the products is seen from the following example of their application in dyeing.

Example 4

A vat is made up as follows: 1000 parts of water at 120° F., 1.25 parts of aqueous ammonia (sp. gr. 0.880), 0.3 part of sodium hydrosulphate, are dissolved together, 2.5 parts of aqueous glue solution and 25 parts of Indigo LL vat I are added.

When the vat is clear and greenish yellow 1.25 parts of the product of Example 3 are added. Wool is dyed in the usual way. The dyed fabric has excellent fastness to rubbing.

We claim:

1. A process for the manufacture of products suitable for use as emulsifying or dispersing agents or as textile assistants which comprises interacting ethylene oxide with partially oxidized marine animal oils which are obtained in processes for oil tanning skins.

2. A process as set forth in claim 1 wherein the partially oxidized marine animal oil which is employed is sod oil.

3. A process as claimed in claim 1 wherein interaction is carried out in the presence of a catalytic substance such as a surface active solid or a caustic alkali.

4. A process as claimed in claim 1 wherein the amount of partially oxidized marine animal oil and the amount of ethyene oxide are in a ratio between 1:1 and 1:3.

5. Reaction products which are produced by interacting ethylene oxide with partially oxidized marine animal oils which are obtained in processes for oil tanning skins.

6. Reaction products which are produced by interacting ethylene oxide with sod oil, said sod oil having been recovered from skins which were oil tanned with a marine animal oil.

7. Reaction products which are produced by interacting ethylene oxide with sod oil in the presence of a caustic alkali, said sod oil having been recovered from skins which were oil tanned with a marine animal oil.

8. Reaction products which are produced by heating ethyene oxide with sod oil in the presence of a little caustic alkali wherein the amount of sod oil and the amount of ethylene oxide are in a ratio between 1:0.5 and 1:3, said sod oil having been recovered from skins which were oil tanned with a marine animal oil.

9. Reaction products which are produced by heating 2 parts of ethylene oxide with 1 part of sod oil in the presence of a trace of caustic alkali, said sod oil having been recovered from skins which were oil tanned with a marine animal oil.

HENRY ALFRED PIGGOTT.
GEORGE STUART JAMES WHITE.